United States Patent Office 3,268,448
Patented August 23, 1966

3,268,448
ZINC CHLORIDE PHOSPHOTHIOUREA COMPOUNDS
Paul M. Kerschner, Trenton, and Jack Ryer, East Brunswick, N.J., assignors to Cities Service Oil Company, Bartlesville, Okla., a corporation of Delaware
No Drawing. Original application Feb. 28, 1963, Ser. No. 261,811, now Patent No. 3,218,342, dated Nov. 16, 1965. Divided and this application Apr. 30, 1965, Ser. No. 462,463
7 Claims. (Cl. 252—46.4)

This application is a division of our copending application SN. 261,811, filed February 28, 1963, for Zinc Chloride Phosphothiourea Compounds, now U.S. Patent No. 3,218,342.

This invention relates to new organo-metallic compounds and more particularly to zinc chloride complexes of certain phosphothiourea compounds.

There has been in recent years a growing interest in the combination of organic radicals and metals or metal salts to provide new and unique structures having a variety of characteristics and properties which serve a multitude of purposes. New organo-metallic structures have been found particularly useful as catalysts, solvents, chemical intermediates, additives and in many other applications.

The novel organo metallic compounds of this invention can be represented by the general formula

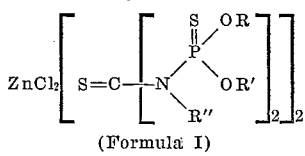

(Formula I)

wherein each of R, R' and R'' are hydrocarbon radicals, alike or different, of from 2 to about 22 carbon atoms selected from the group consisting of alkyl, alicyclic, aryl, aralkyl and alkaryl radicals and mixtures thereof.

The novel compounds of the present invention are prepared by first synthesizing a phosphothiourea intermediate compound which is thereafter reacted with zinc chloride to produce a complex having the structure shown in the hereinabove described general Formula I.

The phosphothiourea intermediates which are reacted with zinc chloride can be represented by the following formula:

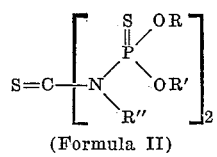

(Formula II)

wherein R, R' and R'' are the radicals represented by the identical letters in Formula I.

The phosphothiourea intermediate is prepared by first reacting a halogenated substituted thiophosphate, as represented by the hereinafter described Formula III, with a primary amine to produce an amidothiophosphate, which can be represented by the hereinafter described Formula IV. The amidothiophosphate is then reacted with carbon disulfide to give the phosphothiourea intermediate. Illustratively, the preparation of the phosphothiourea intermediate is carried out by first reacting one mole of a selected thiophosphate with one mole of a primary amine in an organic solvent to produce the amidothiophosphate. A molar excess of the amine reactant may also be used to insure completeness of reaction. The amidothiophosphate is dissolved in an organic solvent such as toluene and carbon disulfide is added to the mixture. The mixture is brought to reflux temperature. After a suitable period of time, the phosphothiourea is recovered by conventional techniques such as filtration, fractional distillation, and the like. The solvents used in this preparation may be any suitable solvent boiling below the boiling points of the reaction products. Hydrocarbon solvents such as benzene and toluene are generally preferred.

The thiophosphates used in the preparation of the phosphothiourea are substituted halogenated thiophosphates of the general formula

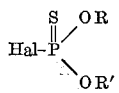

(Formula III)

The halogen portion may be bromine, chlorine or iodine but in general chlorine is preferred. The R and R' components are hydrocarbon radicals having from 2 to about 22 carbon atoms, as in Formula I, alike or different, such as ethyl, propyl, isopropyl, butyl, isobutyl, pentyl, isopentyl, t-pentyl, hexyl, cyclohexyl, heptyl, octyl, phenyl,-2-ethylbenzyl, naphthyl, nonyl, decyl, cyclooctyl, 1-butylcyclohexyl, fluorenyl, 3-cyclohexylpentyl, 10-benzyldecyl, dodecyl, tridecyl, tetradecyl, pentadecyl, hexadecyl, heptadecyl, octadecyl and eicosanyl. Each of R and R' preferably has at least 6 carbon atoms when representing a hydrocarbon radical which includes a cyclic portion.

The amidothiophosphate reaction products of the primary amines and substituted halogenated thiophosphates can be represented by the general formula:

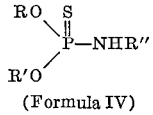

(Formula IV)

wherein R, R' and R'' are radicals as described above.

The primary amines used in the preparation of the amidothiophosphate intermediates can be any primary amine wherein the hydrocarbon substituent R'' is the same as in Formula I such as alkyl amines of from 2 to 22 carbon atoms, in straight or branched chain configuration, as well as alicyclic, aryl, alkaryl and aralkyl radicals, or mixtures of the same having up to about 22 carbon atoms. Suitable amines are: propylamine, butylamine, isobutylamine, t-butylamine, pentylamine, benzylamine, 4-isopropylaniline, cyclohexylamine, heptylamine, aniline, t-octylamine, 2-ethylhexylamine, 2,4-diethylcyclohexylamine, decylamine, mesidine, 1-naphthylamine, 1-fluorenamine, undecylamine, dodecylamine, tridecylamine, phenethylamine, 2-benzyloctylamine, and 2,2-dimethylecosanylamine. R'' preferably has at least 6 carbon atoms when representing a hydrocarbon radical which includes a cyclic portion. Particularly useful in the preparation of these new compounds are "Primene 81R" and "Primene JM-T," mixtures of tertiary alkyl primary amines having 12 to 14 carbon atoms and 18 to 22 carbon atoms respectively. The novel compounds of this invention have been found to be most effective as extreme pressure additives when utilized in small amounts in various lubricating compositions which include synthetic, as well as mineral oil base lubricants.

In preparing lubricant compositions with the extreme pressure agents of the present invention it has been found that an amount of additive of from 0.05% to about 15.0% by weight makes a most satisfactory lubricant composition. Preferably, the agent or extreme pressure additive will be used in an amount of from 0.1 to about 10% by weight of the base lubricant material. In preparing these new lubricant compositions, it has been found that a wide variety of both mineral oil and synthetic base stocks, including mixtures of the same, can be used. Suitable mineral oil base materials include 100 and 200 neutral oils, light and heavy intermediate mineral oils, bright stock and as well as combinations of the foregoing. If a synthetic base material is used diesters, polyester, silicones, silicates, fluorocarbons, phosphates, polyglycols and polyphenyl ethers and mixtures of the same may be used.

In preparing the compositions of the present invention, it may be desirable to improve certain properties and characteristics of the composition by utilizing various known additives such as anti-oxidants, color stabilizers, viscosity improvers, pour point depressants, anti-foam agents and detergents. These materials will be added in varying amounts depending on the particular use intended for the lubricant composition and the final characteristics desired in the composition. Typical anti-oxidants which may be used for this purpose are phenothiazine, phenyl-α-naphthylamine, 2,6-ditertiarybutyl-p-cresol and diphenyl-p-phenylenediamine. Suitable viscosity improvers include the following: polyacrylates, polyisobutylenes and polyvinyls. If a pour point depressant is desired, small amounts of one or more of the following materials may be added: condensation product of naphthalene and paraffin wax, polyacrylates and acrylate-vinyl copolymers.

The examples which follow will provide a more complete understanding of the new compounds and their manner of preparation, as well as the lubricant compositions in which these compounds are used.

EXAMPLE 1

Into a three-neck, three liter flask equipped with a mechanical stirrer, a dropping funnel, a condenser and a thermometer, were placed 378 grams (2 mols) of diethylchlorothiophosphate and 400 ml. of benzene. The mixture was chilled to 0° C. and 800 grams (4 mols) of "Primene 81R" (a mixture of tertiary alkyl primary amines of from 12 to 14 carbon atoms) was added drop wise with stirring at such a rate as to maintain a temperature of 0 to 5° C. After all the "Primene 81R" has been added, the reaction was continued for an additional five hours at a temperature of 0°. The reaction mixture was then allowed to come to room temperature at which time approximately 300 ml. of water was added to dissolve the excess amine salt.

The aqueous layer was discarded and the organic phase was washed with two 250 ml. portions of a 5% sodium carbonate solution. The washed solution was then dried with anhydrous potassium carbonate. The benzene solvent and unreacted amine were stripped off by the distilling at reduced pressure.

352 grams (1 mol) of the first reaction product and 300 ml. of toluene were added to the apparatus described above. The mixture was rapidly stirred and again chilled to 0° C. 38 grams (0.5 mol) of carbon disulfide was added drop wise while maintaining the temperature of 0 to 5° C. After all of the $CS_2$ was added the reaction mixture was brought to a reflux temperature and the reaction was allowed to continue for 10 hours. The solvent was removed by distilling at reduced pressure. An analysis of the final reaction product showed 3.17% N and 8.3% P (calculated values 3.75% N, 8.31% P).

EXAMPLE 2

According to the procedures set forth in Example 1, 217 gm. (1 mol) of diisopropylchlorothiophosphate is reacted with 150 gm. (1 mol) of t-nonylamine. 340 gm. (1 mol) of the product of the first reaction is reacted with 38 gm. (0.5 mol) of carbon disulfide. The final product was recovered as described.

EXAMPLE 3

Following the procedure of Example 1, 357 gm. (1 mol) of dioctylchlorothiophosphate is reacted with 370 gm. (2 mols) of dodecylamine. The product is washed with a 5% sodium carbonate solution. Drying is accomplished by the use of anhydrous potassium carbonate. 505 gm. (1 mol) of the dried product is then reacted with 38 gm. (0.5 mol) of carbon disulfide and the final product is recovered as described.

EXAMPLE 4

According to the procedures of Example 1, 413 gm. (1 mol) of didecylchlorothiophosphate is reacted with 258 gm. (2 mols) of t-octylamine and 505 gm. (1 mol.) of that product is reacted with 38 gm. (0.5 mol.) of carbon disulfide. Recovery of the final product is accomplished as described.

EXAMPLE 5

Following the procedure already set forth herein, 273 gm. (1 mol) of dipentylchlorothiophosphate is reacted with 630 gm. (2 mol.) of "Primene JM–T" (a mixture of tertiary alkyl primary amines of from 18 to 22 carbon atoms). 551 gm. (1 mol.) of the product of this first reaction is recovered as described and then reacted with 38 gm. (0.5 mol.) of carbon disulfide.

EXAMPLE 6

According to the procedures set out in Example 1, 413 gm. (1 mol) didecylchlorothiophosphate is reacted with 146 gm. (2 mols) of tertiary butylamine. The product of this first reaction is recovered and 449 gm. (1mol) thereof is reacted with 38 gm. (0.5 mol) of carbon disulfide. The final product is recovered by distillation under reduced pressure.

EXAMPLE 7

Into a three-neck, three liter flask equipped with a mechanical stirrer, a dropping funnel, a condenser and a thermometer, are placed 343 gm. (1 mol) of octylhexylchlorothiophosphate and 400 ml. of benzene. The mixture is chilled to 0° C. and 200 gm. (1 mol) of "Primene 81R" (a mixture of primary alkyl amines in the $C_{12}$ to $C_{14}$ range) is added drop wise with stirring, at such a rate that the reaction temperature is maintained within the range of 0° C. and 5° C. The reaction is continued for five hours. The reaction mixture is allowed to come to room temperature and 300 ml. of water are added.

The aqueous phase is discarded and the organic phase is washed with two 250 ml. portions of 5% sodium carbonate solution. The washed solution is dried with anhydrous potassium carbonate. The benzene solvent and unreacted amine are stripped off by distillation at reduced pressure.

506 gm. (1 mol) of the reaction product of the above reaction and 300 ml. of toluene are added to the equipment described above. The mixture is rapidly stirred and then chilled to 0° C. 38 gm. (0.5 ml.) of carbon disulfide is added drop wise with stirring while maintaining the reaction temperature with 0° C. and 5° C. The reaction mixture is heated to reflux temperature and the reaction continued for 10 hours. The solvent can be distilled off under reduced pressure to recover the product.

EXAMPLE 8

PREPARATION OF THE ZINC CHLORIDE ADDUCT OF N,N' - DI(O,O-DIETHYLTHIOPHOSPHATE - t - $C_{12}$–$C_{14}$) THIOUREA

Two moles (1488 gm.) of N,N'-di(O,O-diethylthiophosphate-t-$C_{12}H_{25}$—$C_{14}H_{29}$)thiourea (I)

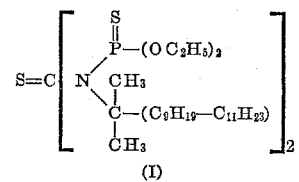

is placed in a 3-neck flask equipped with a stirrer, dropping funnel and reflux condenser. Isopropyl alcohol (500 ml.) is added and the resulting solution is heated to 100° C.

While stirring this solution, 1 mole (136.4 gm.) of zinc chloride dissolved in 500 ml. of hot (100° C.) isopropyl alcohol is added. After all of the isopropyl alcohol-zinc chloride has been added, the reactants are stirred at a temperature of from 100° to 120° C. for an additional hour. The system is then allowed to cool to room temperature and the isopropyl alcohol is removed by distilling at reduced pressure. The residue is the desired product having the formula

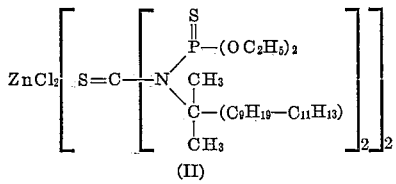

(II)

The thiourea starting material in Example 8, as shown in the structural formula, was a mixture of compounds wherein the long chain portion of the tertiary alkyl radical contained about equal parts by weight of the straight chain hydrocarbon radical having 9, 10 and 11 carbon atoms. The variation in carbon atoms of this hydrocarbon chain is indicated in the structural formula.

EXAMPLE 9

By following the procedure of Example 8 and substituting the equivalent stoichiometric quantities of the thiourea compounds of Examples 2–7, the corresponding zinc chloride adducts are prepared.

EXAMPLE 10

To demonstrate the extreme pressure characteristics of lubricants to which these compounds may be added, a base stock comprising 40% 200 neutral mineral oil and 60% 150 "bright stock" was prepared. A 5% mixture of the zinc chloride adduct of Example 8, designated as additive A, with this base stock was also prepared. These two mixtures were tested in the Timken lubricant tester. This apparatus includes a rotating cup which is brought into contact with fixed test block. The lubricant to be tested is placed between the cup and the block with an adjustable load arm forcing the test block firmly against the rotating cup. After a fixed period of time, the test block is removed and examined for wear. The condition of the test block is taken as a measure of the film strength of the tested lubricant. The results of the tests run on this equipment are shown in Table I.

*Table I.—Timken lubricant test*

| Base Stock | Additive | Percent Additive | OK Load (lb.) | Scar Diam. (mm.) | Condition of Test Block |
|---|---|---|---|---|---|
| 40% 200 Neutral<br>60% 150 Bright Stock | | 0 | 10 | 0.9 | Pass. |
| 40% 200 Neutral<br>60% 150 Bright Stock | A | 0<br>5 | 15<br>30 | <br>0.6 | Fail.<br>Pass. |

It can be seen from the above table that the film strength of the lubricant containing the additive was at least two times greater than that of the straight base stock.

EXAMPLE 11

To demonstrate the corrosion inhibiting characteristics of lubricants to which the compounds of this invention may be added, a base stock was prepared comprising about 40% Lt. Int. Neut. and 60% of Hvy. Int. Neut. A 2% mixture of the zinc chloride adduct of Example 8, designated as additive A, with this base stock was also prepared. These two mixtures were tested by the MacCoull corrosion test. Briefly, this test determines the corrosive effects of petroleum lubricating oils on specific bearing metals when the test oil is oxidized in air at an elevated temperature in contact with a catalytic surface. A stainless steel shaft is rotated in a copper bearing at 3,000 r.p.m. for 10 hours at 350° F. The results of this test are shown in Table II wherein the effectiveness of the additive is evidenced by a decrease in the weight loss of a bearing as compared to the weight loss of a bearing tested with the base stock without the additive.

*Table II*

| Base Stock | Additive | Percent Additive | Bearing Loss, mg. |
|---|---|---|---|
| 40% Lt. Int. Neut.<br>60% Hvy. Int. Neut. | None | 0 | 200 |
| 40% Lt. Int. Neut.<br>60% Hvy. Int. Neut. | A | 2 | 0.8 |

EXAMPLE 12

To demonstrate extreme pressure properties imparted to base stock by the compounds of this invention, varying quantities of the zinc chloride adduct of Example 8 were added to base stock and tested in Shell 4 ball extreme pressure tester. Extreme pressure properties are determined in this test by subjecting lubricants to a series of tests at increasing loads up to the point at which seizure or welding of steel test pieces in contact with the lubricant occurs. The test pieces consist of four polished steel balls arranged and an equilateral tetrahedron. Three of the balls are clamped in a ball pot and submerged in the test oil, while the fourth is rotated about a vertical axis in a motor driven chuck in contact with the other three. The torque on the fourth ball is indicated by a gauge. The formation of scars on the four balls due to poor lubricant qualities is evidenced by an increase in the torque measurement. This is referred to as seizure. A complete failure of the lubricant is referred to as weld wherein the heat generated on the four moving balls is great enough to cause them to become welded to each other. The results of these tests are shown in Table III wherein a lubricant stock containing the zinc adduct of Example 8 is compared to such stock without this compound. The zinc chloride adduct of Example 8 is referred to as additive A in the table.

*Table III.—Shell 4-ball test*

| Base Stock | Additive | Additive | Load Seizure, kg. | Load Weld, kg. |
|---|---|---|---|---|
| 100 Neutral | None | 0 | 60 | 80 |
| | A | 1 | 90 | 110 |
| | A | 3 | 120 | 140 |
| | A | 10 | 130 | 150 |
| Plexol 201* | None | 0 | 50 | 90 |
| | A | 1 | 80 | 100 |
| | A | 3 | 110 | 140 |
| | A | 5 | 110 | 150 |
| | A | 10 | 110 | 150 |

*Di-2-ethylhexyl sebacate.

In addition to the extreme pressure properties imparted to lubricants by the zinc chloride adducts of this invention, these adducts are efficatious in preventing corrosion of metal parts such as iron in contact with the lubricants. Tests show that at a 5% concentration the compounds (adducts) of this invention are about twice as effective in preventing corrosion as the use of the phosphothiourea compounds which have not been reacted with zinc chloride.

We claim:
1. A lubricating composition comprising a major amount of lubricating oil and a quantity of an additive sufficient in amount to provide the composition with extreme pressure properties, said additive having the formula:

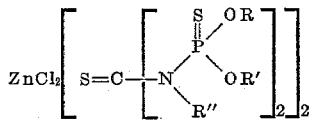

wherein each of R, R', and R'' is a hydrocarbon radical selected from the group consisting of alkyl, saturated alicyclic, aryl, aralkyl and has from 2 to about 22 carbon atoms.

2. A composition of claim 1 wherein each of R, R', and R'' of the additive is alkyl having from 2 to about 22 carbon atoms.

3. A composition of claim 1 wherein the additive has the formula:

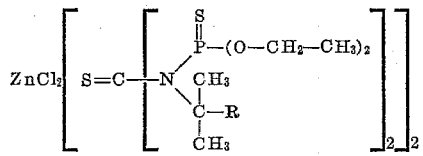

wherein R is alkyl having from 9 to 11 carbon atoms.

4. A composition of claim 1 wherein the additive has the formula:

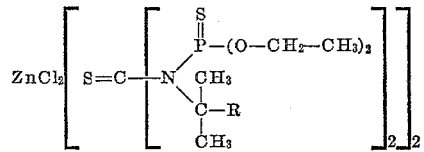

wherein R is alkyl having from 15 to 19 carbon atoms.

5. A mineral oil lubricating composition comprising a major amount of lubricating oil and a quantity of an additive sufficient in amount to provide the composition with extreme pressure properties, said additive having the formula:

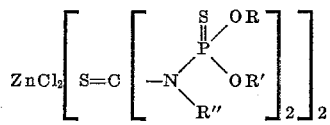

wherein each of R, R', and R'' is a hydrocarbon radical selected from the group consisting of alkyl, saturated alicyclic, aryl, aralkyl and has from 2 to about 22 carbon atoms.

6. A composition of claim 5 wherein R, R', and R'' of the additive are mixed alkyls having from 2 to about 22 carbon atoms.

7. A composition of claim 5 wherein each of R and R' of the additive is ethyl and R'' represents mixed alkyls having from 9 to 11 carbon atoms.

References Cited by the Examiner

UNITED STATES PATENTS

| | | | |
|---|---|---|---|
| 2,146,584 | 2/1939 | Lipkin | 252—47 |
| 2,209,464 | 7/1940 | Loane et al. | 252—47 |
| 2,753,306 | 7/1956 | Fields | 252—46.4 |
| 2,758,089 | 8/1956 | Hoff et al. | 252—46.4 |
| 2,944,075 | 7/1960 | Debo | 260—461 |
| 3,053,876 | 9/1962 | Malz et al. | 260—461 |

DANIEL E. WYMAN, *Primary Examiner.*

L. G. XIARHOS, *Assistant Examiner.*